United States Patent [19]
Park et al.

[11] Patent Number: 5,590,241
[45] Date of Patent: Dec. 31, 1996

[54] SPEECH PROCESSING SYSTEM AND METHOD FOR ENHANCING A SPEECH SIGNAL IN A NOISY ENVIRONMENT

[75] Inventors: Sangil Park; Ed F. Martinez, both of Austin, Tex.; Dae-Hee Youn, Seoul, Rep. of Korea

[73] Assignee: Motorola Inc., Schaumburg, Ill.

[21] Appl. No.: 54,494

[22] Filed: Apr. 30, 1993

[51] Int. Cl.⁶ .................................. G10L 3/02; G10L 9/00
[52] U.S. Cl. ....................... 395/2.36; 395/2.12; 395/2.35; 395/2.37; 395/2.42
[58] Field of Search ........................ 381/38, 47, 71–72; 395/2, 2.1, 2.34–2.36, 2.4, 2.42, 2.67, 2.74, 2.12, 2.7; 379/410; 364/724.19

[56] References Cited

U.S. PATENT DOCUMENTS

| | | | |
|---|---|---|---|
| 4,184,049 | 1/1980 | Crochiere et al. | 395/2.38 |
| 4,335,276 | 6/1983 | Bull et al. | 179/1 SP |
| 4,468,804 | 8/1984 | Kates et al. | 395/2.74 |
| 4,490,839 | 12/1984 | Bunge | 381/47 |
| 4,653,102 | 3/1987 | Hansen | 395/2 |
| 4,747,143 | 5/1988 | Kroeger et al. | 395/2.34 |
| 4,852,169 | 7/1989 | Veeneman et al. | 381/38 |
| 4,916,743 | 4/1990 | Takizawa et al. | 381/45 |
| 4,952,931 | 8/1990 | Serageldin et al. | 395/2 |
| 5,083,310 | 1/1992 | Drory | 395/2.21 |
| 5,148,488 | 9/1992 | Chen et al. | 381/47 |
| 5,251,263 | 10/1993 | Andrea et al. | 381/71 |
| 5,260,896 | 11/1993 | Iwasaki | 364/724.19 |
| 5,293,425 | 3/1994 | Oppenheim et al. | 381/71 |
| 5,319,736 | 6/1994 | Hunt | 395/2.36 |
| 5,353,376 | 10/1994 | Oh et al. | 395/2.42 |
| 5,396,554 | 3/1995 | Hirano et al. | 379/410 |

OTHER PUBLICATIONS

Kim et al, "Adaptive multichannel digital filter with lattice–escalator hybrid structure", ICASSP '90, pp. 1413–1416 vol. 3, 3–6 Apr. 1990.

Park; "170 MIPS Real–Time Adaptive Digital Filter Board"; Mota., Inc.; Oct. 4–8 91st Convention; pp. 1–20 (1991).
Park; "Full–Duplex Hands–Free Mobile Phone System for a Digital Cellular"; Engineering Society; pp. 1–12 (Mar. 1–5, 1993).
Boll, et al.; "Suppression of Acoustic Noise in Speech Using Two Microphone Adaptive Noise Cancellation"; IEEE Trans. on ASSP.; vol. 28, No. 6, pp. 752–753 (1980).
Widrow, et al.; "Adaptive Noise Cancelling: Principles and Applications"; Proceedings of The IEEE; vol. 63, No. 12, pp. 1692–1716 (1975).
Milenkovic, et al.; "Two Point Acoustic Reconstruction of Sustained Vowel Area Functions"; Elsevier Science Pub. B.V.; pp. 351–362 (1985).
Petek; "Two–Channel Speech Analysis Using Accelerometer Output Signal As A Ref. Signal"; Dept. of Computer Science; pp. 114–117 (1989).
Viswanathan, et al.; "Noise–Immune Speech Transduction Using Multiple Sensors"; B. Beranek & Newman Inc.; IEEE Internat'L Conf. on ASSP; vol. 2, pp. 712–715 (1985).

(List continued on next page.)

*Primary Examiner*—Tariq R. Hafiz
*Attorney, Agent, or Firm*—Paul J. Polansky

[57] ABSTRACT

A speech processing system (30) operates in a noisy environment (20) by performing adaptive prediction between inputs from two sensors positioned to transduce speech from a speaker, such as an accelerometer and a microphone. An adaptive filter (37) such as a finite impulse response (FIR) filter receives a digital accelerometer input signal, adjusts filter coefficients according to an estimation error signal, and provides an enhanced speech signal as an output. The estimation error signal is a difference between a digital microphone input signal and the enhanced speech signal. In one embodiment, the adaptive filter (37) selects a maximum one of a first predicted speech signal based on a relatively-large smoothing parameter and a second predicted speech signal based on a relatively-small smoothing parameter, with which to normalize a predicted signal power. The predicted signal power is then used to adapt the filter coefficients.

9 Claims, 2 Drawing Sheets

OTHER PUBLICATIONS

Viswanathan, et al.; "Multisensor Speech Input For Enhanced Imm. To Acoustic Background Noise"; B. Beranek & Newman Inc.; IEEE; pp. 193–196 (1984).

Krishnamurthy, et al.; "Two–Channel Speech Analysis"; IEEE Trans. on ASSP; vol. 34, No. 4, pp. 730–743 (1986).

Viswanathan, et al.; "Evaluation of Multisensor Speech Input for Speech Recognition in High Ambient Noise"; BBN Laboratories; pp. 1–4 (1986).

SPEECH PROCESSING SYSTEM AND METHOD FOR ENHANCING A SPEECH SIGNAL IN A NOISY ENVIRONMENT

FIELD OF THE INVENTION

This invention relates generally to signal processing systems, and more particularly, to speech processing systems.

BACKGROUND OF THE INVENTION

In a typical speech processing system, a microphone is used to recover the speech. The microphone produces an analog signal corresponding to the acoustic vibrations it receives. However, some environments are so noisy that the microphone input signal cannot be understood. These extremely noisy environments may also produce noise which is constantly changing and thus is very difficult to filter. Cellular telephones, cordless telephones, and mobile radios are frequently used in environments with high noise levels.

One technique for discerning speech in these extremely noisy environments is to use two input sensors, such as two microphones or a microphone and an accelerometer. The inputs from the two sensors are filtered in analog filters, weighted, and combined to produce an enhanced speech signal. See, for example, Viswanathan et al., "Noise Immune Speech Transduction Using Multiple Sensors," *IEEE International Conference on Acoustics, Speech, and Signal Processing,* vol. ICASSP-85, pp. 19.1.1–19.1.4, March 1985. Another technique uses a first microphone placed in proximity to the speaker, to recover a speech signal having a large noise component. See S. Boll and D. Pulsipher, "Suppression of Acoustic Noise in Speech Using Two Microphone Adaptive Noise Cancellation," *IEEE Transactions on Acoustics, Speech and Signal Processing,* vol. ASSP-28, no. 6, pp. 752–754, December 1980. A second microphone is physically isolated from the speaker so as to recover primarily the noise but not the speech. The noise component is subtracted from the input of the first microphone in an adaptive filter in order to recover the speech signal with an improved signal-to-noise ratio (SNR). While both of these techniques are able to improve the SNR in extremely noisy environments, more improvement is desirable.

In addition, if adaptive filtering is used, it is impossible to arrive at an optimum filter response using conventional adaptive filtering techniques. The result is that the filter is either sometimes over-responsive or sometimes under-responsive. An adaptive filter with a least-mean-squares (LMS) predictor, such as the filter used by Boll and Pulsipher, has this problem. A known variant of the LMS technique, the normalized LMS (NLMS) predictor, also has this problem. The NLMS predictor is able to compensate for large changes in signal power by normalizing filter coefficients in relation to the magnitude of the expected signal power. Thus, for example, the NLMS predictor can adapt the filter coefficients at large signal power as accurately as at low signal power. However, the responsiveness of the NLMS predictor depends on the value of a smoothing parameter $\beta$, which ranges from 0 to 1. There is a tradeoff in filter responsiveness depending on the value of $\beta$. If $\beta$ is too small, i.e. too much less than 1, then the filter is over-responsive, leading to unstable response. If $\beta$ is too large, i.e. too close to 1, however, the filter is under-responsive and rapid changes in the input signal power are reflected in the output only very slowly. Thus, both a speech processing system which works well in extremely noisy environments and an adaptive filter which has better responsiveness are needed.

SUMMARY OF THE INVENTION

Accordingly, there is provided, in one form, a speech processing system for enhancing speech signals in an noisy environments. The speech processing system has a first input terminal for receiving a first digital input signal produced from a first sensor, and a second input terminal for receiving a second digital input signal produced from a second sensor. The first and second digital input signals are characterized as having correlated speech components. The speech processing system also includes an adaptive filter and a summing device. The adaptive filter has a signal input for receiving the second digital input signal, a feedback input for receiving an estimation error signal, and an output for providing an enhanced speech signal. The summing device has a positive input for receiving the first digital input signal, a negative input terminal for receiving the second digital input signal, and an output terminal coupled to the feedback input terminal of the adaptive filter, for providing the estimation error signal.

In another form, there is provided a method for enhancing speech signals in a noisy environment. A speech signal $x(k)$ is provided to an input of an adaptive finite impulse response (FIR) filter. A first signal power estimate $y(k)$ at a sample point k is computed by the formula $y(k)=\beta_1 y(k-1)+(1-\beta_1)x^2(k)$. A second signal power estimate $z(k)$ at sample point k is computed by the formula $z(k)=\beta_2 z(k-1)+(1-\beta_2)x^2(k)$. A value of $\beta_1$ is chosen to be greater than a value of $\beta_2$. An overall signal power estimate $yz(k)$ at the sample point k is selected as a maximum of the first signal power estimate $y(k)$ and the second signal power estimate $z(k)$. A plurality of FIR filter coefficients of the adaptive FIR filter are recursively updated according to a normalized least-mean-squares (NLMS) prediction using the overall signal power estimate $yz(k)$ and an estimation error signal. An output of the adaptive FIR filter is provided as an enhanced speech signal.

These and other features and advantages will be more clearly understood from the following detailed description taken in conjunction with the accompanying drawings.

DETAILED DESCRIPTION OF A PREFERRED EMBODIMENT

Figure 1:
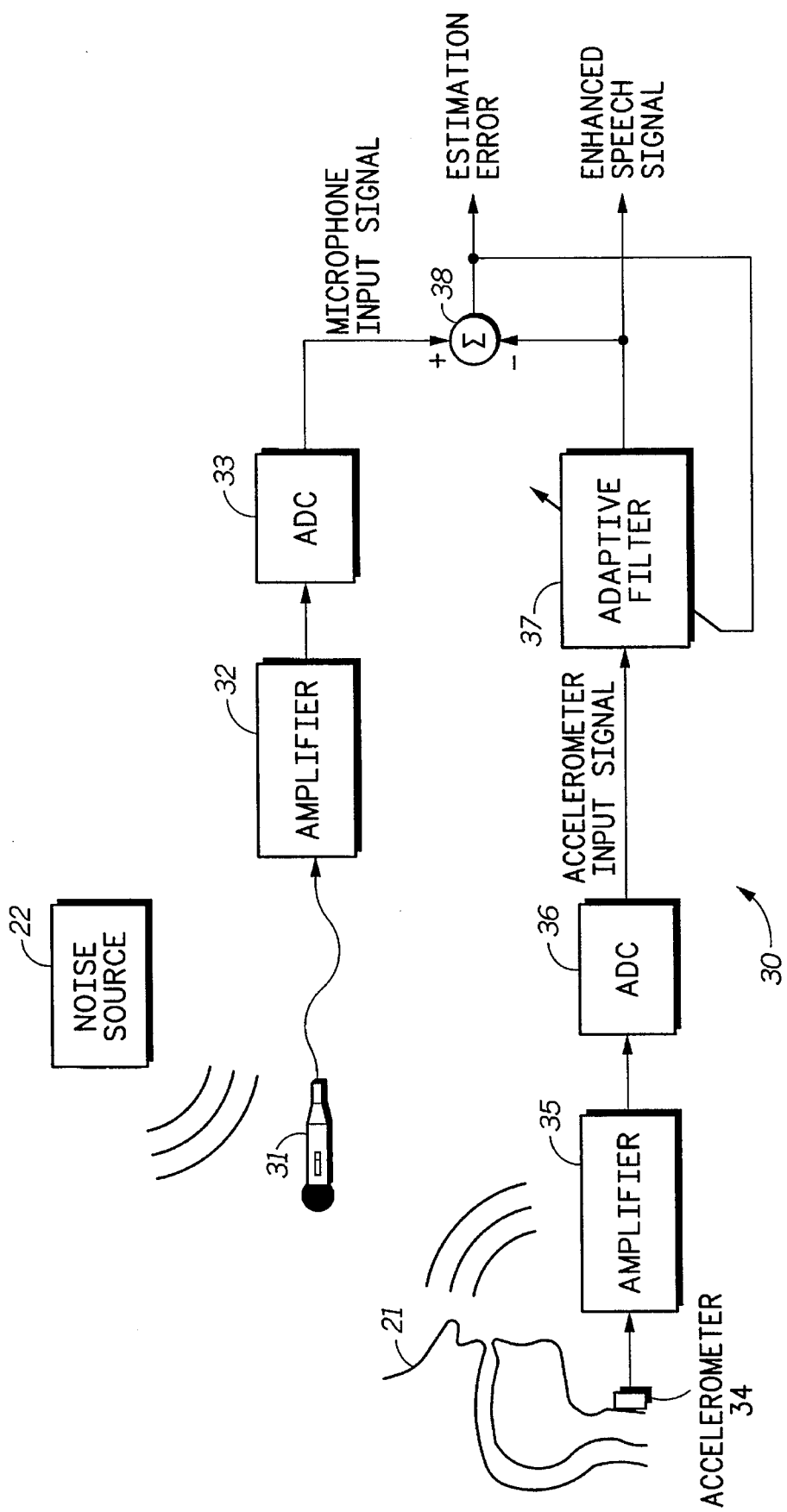
FIG. 1 illustrates in block diagram form a speech processing system in accordance with the present invention.

FIG. 1 illustrates in block diagram form a speech processing system 30 in accordance with the present invention. Speech processing system 30 exists in a noisy environment 20. Noisy environment 20 includes a human being 21 acting as a speech signal source, and a noise source 22. Noise source 22 represents all environmental noise, such as air flow and engine noise from an aircraft cockpit.

Speech processing system 30 includes a microphone 31, an amplifier 32, an analog-to-digital converter (ADC) 33, an accelerometer 34, an amplifier 35, an ADC 36, an adaptive filter 37, and a summing device 38. Microphone 31 is a conventional audio microphone such as a unidirectional microphone, which is acoustically coupled to noisy environment 20. Microphone 31 has an output which provides an electrical signal to an input of amplifier 32. Amplifier 32 is a conventional analog amplifier which amplifies the audio signal to a level which may be converted to a digital signal. Thus, amplifier 32 has an output connected to an input of ADC 33. ADC 33 is a conventional analog-to-digital converter such as a resistor/capacitor array converter, or preferably, an oversampled analog-to-digital converter based on a sigma-delta modulator. ADC 33 provides a digital signal, labelled "MICROPHONE INPUT SIGNAL", at an output thereof. MICROPHONE INPUT SIGNAL is responsive to all sound received from noisy environment 20, including that received from noise source 22, and thus in noisy environment 20 has a relatively low signal-to-noise ratio (SNR).

Accelerometer 34 is physically attached to the larynx area of the neck of human being 21, and provides an electrical output signal at an output thereof indicative of vibrations present at the larynx area of the neck of human being 21. Accelerometer 34 is preferably a conventional piezoelectric accelerometer which produces an output correlated with the speech component of the output of microphone 31. Since the tissue between the larynx and the neck acts like a lowpass filter, accelerometer 34 produces a signal which has primarily low-frequency speech components. Also, accelerometer 34 is insensitive to the acoustic noise produced by noise source 22. It should be noted that other types of electromechanical transducers which produce outputs having signal components highly-correlated with the speech component of microphone 31 may also be used.

Amplifier 35 has an input connected to accelerometer 34, and an output coupled to an input of ADC 36. Amplifier 35 is also a conventional analog amplifier which amplifies the audio signal provided by accelerometer 34 to a level which may be converted to a digital signal. ADC 36 has an output for providing a digital signal labelled "ACCELEROMETER INPUT SIGNAL". ADC 36 is also a conventional analog-to-digital converter such as a resistor/capacitor array converter, or preferably, an oversampled analog-to-digital converter based on a sigma-delta modulator.

Adaptive filter 37 has a signal input for receiving ACCELEROMETER INPUT SIGNAL, an error input, and an output for providing a signal labelled "ENHANCED SPEECH SIGNAL". Summing device 38 has a positive input terminal for receiving MICROPHONE INPUT SIGNAL, a negative input terminal for receiving the ENHANCED SPEECH SIGNAL, and an output terminal for providing a signal labelled "ESTIMATION ERROR" to the error input of adaptive filter 37.

Speech processing system 30 is able to provide a speech signal which cancels a significant amount of the noise produced by noise source 22 by performing adaptive filtering on ACCELEROMETER INPUT SIGNAL based on the error signal developed between the ENHANCED SPEECH SIGNAL and the MICROPHONE INPUT SIGNAL. Thus, speech processing system 30 adaptively filters the input of one sensor based on the input of a second sensor which has a correlated speech component. In addition, adaptive filter 37 recursively updates its coefficients to respond to the changing noise characteristics of extremely noisy environments, such as aircraft cockpits.

In a preferred form, ADC 33 and ADC 36 are hardware converters integrated with a general-purpose digital signal processor on a single integrated circuit. This digital signal processor (not shown) performs the summing associated with summing device 38, and the adaptive filtering associated with adaptive filter 37, efficiently through software using its instruction set. However, in other embodiments, the functions of signal processing system 30 may be performed by different combinations of hardware and software.

Figure 2:
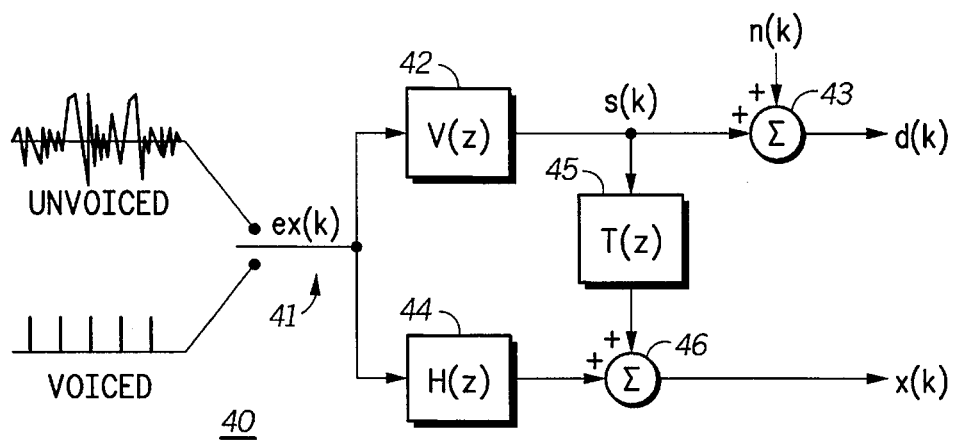
FIG. 2 illustrates in block diagram form a source model useful in analyzing the speech processing system of FIG. 1.

FIG. 2 illustrates in block diagram form a source model 40 useful in analyzing speech processing system 30 of FIG. 1. An excitation signal ex(k) is the result of two types of sounds: unvoiced sounds, modeled as white noise, which corresponds to consonants; and voiced sounds, modeled as a periodic impulse signal, corresponding to vowels. The excitation signal ex(k) thus alternates between the two types of sounds, represented by a switch 41 alternating between a first source labelled "UNVOICED" and a second source labelled "VOICED". A human vocal tract system 42 is excited by signal ex(k) and provides a transfer function labelled "V(z)" by which signal ex(k) becomes a speech signal labelled "s(k)". A summing device 43 sums speech signal s(k) with environmental noise signal labelled "n(k)" to provide a resulting signal labelled "d(k)" which is received by the primary sensor, such as microphone 31. Signal d(k) corresponds to the MICROPHONE INPUT SIGNAL of FIG. 1. A transfer function 44 labelled "H(z)" represents the transfer function between the vocal cord vibration and the secondary sensor, such as accelerometer 34. A transfer function 45 labelled "T(z)" represents the path transferring the speech signal to the secondary sensor. A summing device 46 represents the combination of these paths to the secondary sensor by summing the outputs of transfer functions H(z) and T(z) to provide secondary signal x(k). Secondary signal x(k) corresponds to the ACCELEROMETER INPUT SIGNAL of FIG. 1.

The desired speech signal s(k) can be obtained by the following z-domain equation:

$$S(z)=A(z)X(z) \qquad [1]$$

where $$A(z)=1/(T(z)+(H(z)/V(z))) \qquad [2]$$

To find time-domain signal s(k), it is necessary to find the transfer function, A(z), when the reference input signal x(k) and the noise-corrupted speech signal d(k) are given.

Figure 3:
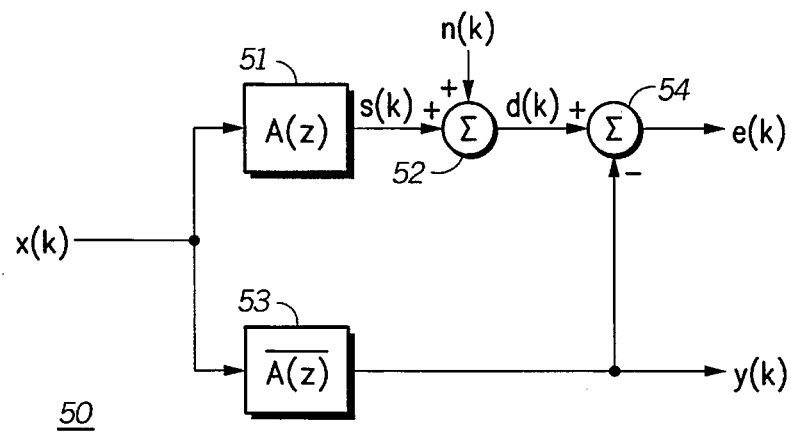
FIG. 3, which illustrates in block diagram form a model of the speech processing system of FIG. 1.

To find A(z), it is helpful to refer to FIG. 3, which illustrates in block diagram form a model 50 of speech processing system 30 of FIG. 1. Here, signal x(k) passes though a first transfer function 51 labelled "A(z)" to provide signal s(k), which is then modeled as being combined with signal n(k) in a summing device 52 to provide signal d(k). Signal x(k) is also passed through a transfer function 53 which implements the inverse of transfer function A(z), labelled "$\overline{A(z)}$", to provide a speech estimate signal labelled "y(k)", corresponding to the ENHANCED SPEECH SIGNAL of FIG. 1. Signal y(k) is then subtracted from signal d(k) in a summing device 54 to provide an error signal labelled "e(k)", which corresponds to the ESTIMATION ERROR of FIG. 1.

The desired response, d(k), is a speech signal with additive noise, s(k)+n(k). The secondary input x(k) to adaptive filter 37 (corresponding to ACCELEROMETER INPUT SIGNAL) is generated from the excitation signal but the characteristics are changed by transfer function A(z). Since s(k) and x(k) are generated from the same source signal, both signals are statistically closely correlated. Thus, when s(k) and n(k) are uncorrelated, adaptive filter 37 tries to minimize the mean-squared error by making y(k)≈s(k), thereby making y(k) an approximation of signal s(k). During adaptation, the mean-squared error is driven to a minimum by eliminating the speech signal components, s(k), so that the minimum mean-squared error produces the maximum SNR for the estimated output y(k).

If adaptive filter 37 is implemented as a finite impulse response (FIR) filter, the transfer function A(z) is the sum from (i=0) to (i=N−1) of $c_i Z^{-i}$, where N represents the number of coefficients and $c_i$ represents the coefficient value for the ith coefficient. An adaptive FIR filter recursively finds the coefficients to minimize the mean-squared error.

Figure 4:
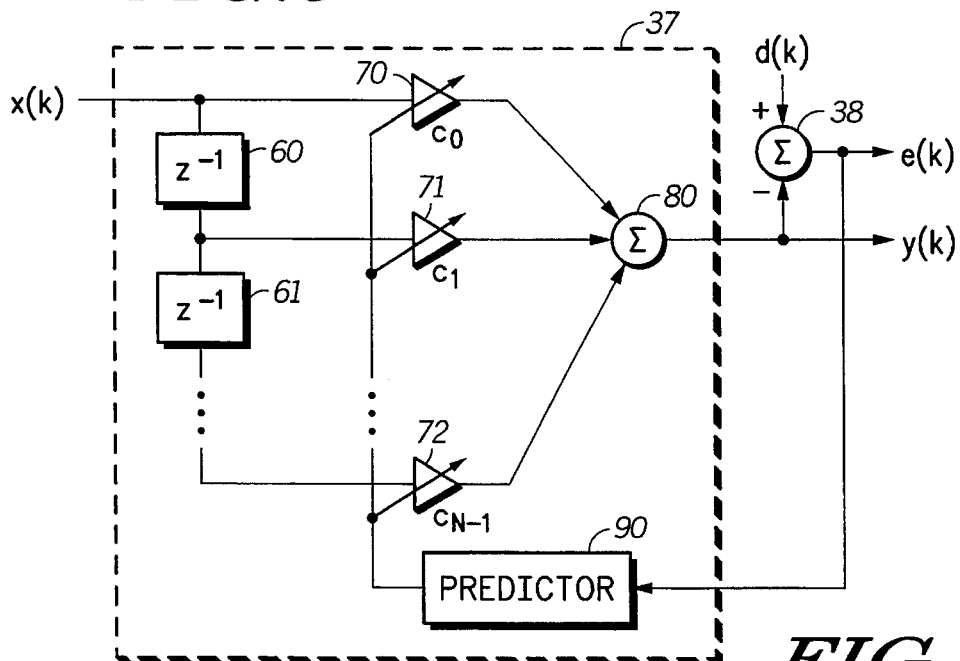
FIG. 4 illustrates in block diagram form an embodiment of the adaptive filter of FIG. 1 in accordance with the present invention.

FIG. 4 illustrates in block diagram form an embodiment of adaptive filter 37 of FIG. 1 in accordance with the present invention. In FIG. 4, all signals are represented with generic signal processing designations corresponding to those used in FIGS. 2 and 3 to emphasize the fact that adaptive filter 37 may be used in other systems besides speech processing system 30. Adaptive filter 37 is a tapped delay line (TDL) FIR filter having a plurality of taps at the outputs of delay elements, a plurality of variable multipliers for multiplying the value at the tap by a variable coefficient, a summing device 80 for summing together the outputs of the variable multipliers to provide the output signal y(k), and a predictor 90 for recursively adjusting the values of the coefficients according to the error signal e(k).

Illustrated in FIG. 4 are two delay elements 60 and 61. Delay element 60 has an input for receiving input signal x(k), and an output. Delay element 61 has an input connected to the output of delay element 60, and an output. All delay elements are connected in series with the input of first delay element 60 receiving signal x(k), and each succeeding delay element has an input connected to the output of a previous delay element.

Signal x(k) and the output of each delay element provide filter taps which are each provided to an input terminal of a corresponding variable multiplier. In FIG. 4, three representative variable multipliers 70, 71, and 72 are illustrated. Variable multiplier 70 has an input for receiving signal x(k), a coefficient input for receiving corresponding coefficient $c_0$, and an output terminal connected to summing device 80. Variable multiplier 71 has an input connected to the output of delay element 60, a coefficient input for receiving corresponding coefficient $c_1$, and an output terminal connected to summing device 80. Variable multiplier 72 has an input connected to the output of a last delay element in adaptive FIR filter 37 (not shown), a coefficient input for receiving corresponding coefficient $c_{N-1}$, and an output terminal connected to summing device 80, where N is equal to the number of filter taps. Thus, adaptive FIR filter 37 has N variable multipliers and (N−1) delay elements.

Summing device 80 has inputs for receiving corresponding ones of the outputs of the variable multipliers, and an output for providing signal y(k). Predictor 90 has an input for receiving signal e(k), and outputs connected to coefficient inputs of corresponding ones of the variable multipliers. Also illustrated in FIG. 4 is summing device 38 of FIG. 1, which has a positive input for receiving signal d(k), a negative input connected to the output terminal of summing device 80 for receiving signal y(k), and an output terminal connected to the input terminal of predictor 90 for providing signal e(k).

Adaptive FIR filter 37 differs from conventional adaptive FIR filters in that predictor 90 is especially well-suited for use in certain applications such as speech processing. Adaptive filters are useful for input signals which are continuously present, because after a short delay the filter coefficients approach an optimum solution to noise cancellation for the particular environment. However, speech is rarely continuous. Instead, a typical speech pattern includes periods of conversation followed by periods of silence. In noisy environments, it is difficult for the adaptive filter to provide a noise-free signal during a period of conversation which immediately follows a long period of silence because of the history in the adaptive FIR filter. To solve this problem, predictor 90 provides coefficients $c_i$ based on a prediction of output signal y(k) which adapts more quickly on the start of a signal than upon the conclusion of a signal, or in other words, has a fast attack and a slow release.

One conventional predictor is the so-called least-mean-squares (LMS) predictor, in which a subsequent coefficient $c_i(k+1)$ is defined as $$c_i(k+1)=c_i(k)+\alpha e(k)x(k-i) \quad [3]$$

where i represents the ith coefficient, k represents the present sample period, $c_i(k)$ is the present coefficient value of the ith coefficient, α is the convergence parameter, e(k) is the error signal at sample k, and x(k−i) is the input signal sample prior to the current sample by i sample periods. Using a 50-tap FIR filter (N=50) with the LMS predictor, α=0.05, and for an input signal with a 0 decibel (dB) SNR, speech processing system 30 provides an output SNR of approximately 6.88 dB.

In an adaptive filter using an LMS predictor, the adaptive adjustments to the coefficients are closely related to signal power $x^2(k)$. Thus, when the input power is large (such as the beginning of a conversation), the adaptation will be fast but also too rough or unstable. Also when the power is low (during a quiet period), the adaptation will be too slow.

Another conventional predictor which may be used is the normalized LMS (NLMS) predictor, defined as $$c_i(k+1)=c_i(k)+(\alpha/\sigma_x^2(k))e(k)x(k-i) \quad [4]$$

where α is normalized by the estimated signal power $\sigma_x^2(k)$ and thus the adaptation rate is independent of the input signal power. In real-time signal processing environments, $\sigma_x^2(k)$ must be estimated, and the most common formula for this estimation is $$\sigma_x^2(k)=\beta\sigma_x^2(k-1)+(1-\beta)x^2(k) \quad [5]$$

where β is the smoothing parameter equal to (1−α) which has a typical value of 0.99. The NLMS predictor has been applied to many adaptive filtering applications such as full-duplex speakerphones and other speech processing systems.

However, the signal power estimation of equation [5] is a lowpass filter type estimation, whose reaction depends on the value of the smoothing parameter β. If β is very close to 1, for example 0.999, the filter will sometimes be under-responsive and the output signal will react slowly to changes in the input signal. In other words, the filter will have both a slow attack and a slow release. On the other hand, if β is much less than 1, for example 0.8, then the filter will sometimes be over-responsive and the output signal will overreact to changes in the input signal. The resulting filter will have both a fast attack and a fast release.

In accordance with the present invention, predictor 90 combines a fast attack and a slow release so that at the beginning of a conversation, the system will not diverge and will not suffer from a "jumpy" or "unsteady" sound problem. This allows the speech processing system to recognize the start of speech soon after the end of a long silent period. Mathematically, predictor 90 provides two estimates of signal power designated y(k) and z(k), given by $$y(k)=\beta_1 y(k-1)+(1-\beta_1)x^2(k) \qquad [6]$$

and $$z(k)=\beta_2 z(k-1)+(1-\beta_2)x^2(k) \qquad [7]$$

wherein $\beta_2$ provides a relatively fast response in relation to $\beta_1$ i.e. $\beta_2$ has a lower value than $\beta_1$. For example, one set of values useful in speech processing system 30 would be $\beta_1=0.999$ and $\beta_2=0.9$. When either y(k) or z(k) is greater than or equal to a predetermined threshold, then the signal power estimate yz(k) used to normalize the input signal in predictor 90 is given by $$yz(k)=\text{maximum}[y(k), z(k)] \qquad [8]$$

Thus, predictor 90 allows a fast attack by selecting the signal power estimate that reacts the quickest to the start of speech, and a slow release by selecting the signal power estimate that lingers the longest in response to the end of a period of speech.

APPENDIX A illustrates an assembly language program which may be used to implement adaptive FIR filter 37 using fast attack and slow release predictor 90. The program includes mnemonics which are executable by a Motorola DSP 56000-family digital signal processor. However, it will be appreciated by those skilled in the art that the program may be modified to run on other general-purpose digital signal processors. Preferably, ADCs 33 and 36 are hardware converters which are implemented along with a general-purpose digital signal processor running this program on a single integrated circuit. However, these elements may be implemented discretely in other embodiments.

While the invention has been described in the context of a preferred embodiment, it will be apparent to those skilled in the art that the present invention may be modified in numerous ways and may assume many embodiments other than that specifically set out and described above. For example, other types of sensors besides accelerometers may be used as the second sensor, as long as their signal component is highly-correlated with the signal component of the first sensor. In addition, adaptive FIR filter 37 may be used in other signal processing systems besides speech processing system 30. Also, the functional blocks illustrated herein may be practiced exclusively by hardware circuitry, exclusively by a digital signal processor executing appropriate instructions, or by some combination thereof. Accordingly, it is intended by the appended claims to cover all modifications of the invention which fall within the true spirit and scope of the invention.

---

APPENDIX A

```
;**********************************************************************
;       Fast Attack and Slow Release Adaptive Filter
;**********************************************************************
taps        equ     255             ; number of adaptive coefficients
beta1       equ     0.999           ; Smoothing parameter for slow release
alpha1      equ     1.-beta1        ; Convergence parameter for slow release
beta2       equ     0.9             ; Smoothing parameter for fast attack
alpha2      equ     1.-beta2        ; Convergence parameter for fast attack
threshold   equ     0.500           ; maximum magnitude for power estimation
Past_Mag1   ds      1               ; Past value for y(k) fast estimation
Past_Mag2   ds      1               ; Past value for z(k) fast estimation
        abs     b #>alpha1,y0           ; Find Magnitude |x(k)|, get Alpha
        move    b,x0                    ; ready for multiply
        mpy     x0,y0,b #>beta1,y0      ; Obtain b=Alpha* |x(k)|
                                        ; Get smoothing parameter Beta
        move    x:Past_Mag1,x0          ; Get past magnitude y(k-1)
        mac     x0,y0,b                 ; Find current smoothed magnitude y(k)
        move    b1,x:Past_Mag1          ; Save current smoothed magnitude
        move    a,b                     ; get the original data sample
        abs     b #>alpha2,y0           ; Find Magnitude |x(k)|, get Alpha
        move    b,x0                    ; ready for multiply
        mpy     x0,y0,b #>beta2,y0      ; Obtain b=Alpha* |x(k)|
                                        ; Get smoothing parameter Beta
        move    x:Past_Mag2,x0          ; get past magnitude z(k-1)
        mac     x0,y0,b x:Past_Mag2,x0  ; Find current smoothed magnitude z(k)
                                        ; Bring back the y(k) value
        cmp     x0,b b1,x:Past_Mag2     ; compare y(k) and z(k), save z(k)
        tlt     x0,b                    ; if x0>b, copy x0 to b (Maximum value)
        move    b1,x:Past_Mag1          ; Save current smoothed magnitude
        move    #>threshold,x0          ; Get maximum threshold value
        cmp     x0,b                    ; compare between yz(k) and threshold
        jle     _limit                  ; if no limiting is found
        move    b,y0                    ; make a denominator
        move    x0,b                    ; make a numerator
        and     #$fe,ccr                ; clear carry bit for division routine
        rep     #24                     ; get 24 bits of resolution
        div     y0,b                    ; divide routine the output is in B0
        move    b0,x0                   ; ready for scaling
        move    a,y0                    ; get original value
        mpyr    x0,y0,a                 ; scaling
```

APPENDIX A

```
_limit
;*************************************************
;       LMS Algorithm Main Loop
;*************************************************
        clr     a       x:(r0)–,x0
        move    x:(r0),b
        move    y0,y:(r4+n4)
        do      #taps,afloop
        mac     x0,y0,a     b,x:(r0)+n0
        move    x0,b
        macr    y0,y1,b     x:(r0)–,x0     y:(r4)–,y0
afloop
;*************************************************
;       Normalization of convergence parameter
;*************************************************
        move    x:Past_Mag1,x0          ; get current |x(k)|
        mpyr    x0,x0,a   x:(r2),x1  y:(r4)+,y0  ; a=x(k)², get yz(k) and b
        mpy     x1,y0,b   a1,x0  y:(r4)–,y1      ; b=beta*yz(k), get 1–b
        macr    x0,y1,b   y:(r5),x0              ; b=b+alpha*yz(k), get alpha,
        move    a,y0      b,x:(r2)                ; update yz(k)
        and     #$fe,ccr                           ; clear carry bit
        rep     #24
        div     y0,a                                ; 24-bit resolution divide routine
```

We claim:

1. A method for enhancing speech signals in a noisy environment, comprising the steps of:

inputting a digital speech signal x(k) at an input of a plurality of successive delay elements whose outputs form a like plurality of taps of an adaptive finite impulse response (FIR) filter;

inputting said digital speech signal and each of said plurality of taps to corresponding inputs of a plurality of variable multipliers;

computing a first signal power estimate y(k) at a sample point k given by the formula $y(k)=\beta_1 y(k-1)+(1-\beta_1)x^2(k)$;

computing a second signal power estimate z(k) at said sample point k given by the formula $z(k)=\beta_2 z(k-1)+(1-\beta_2)x^2(k)$;

choosing a value of $\beta_1$ greater than a value of $\beta_2$;

selecting an overall signal power estimate yz(k) at said sample point k as a maximum one of said first signal power estimate y(k) and said second signal power estimate z(k);

recursively updating a plurality of FIR filter coefficients corresponding to said plurality of variable multipliers according to a normalized least-mean-squares (NLMS) prediction using said overall signal power estimate yz(k) and an estimation error signal to provide updated values of said plurality of FIR filter coefficients;

providing said updated values of said plurality of FIR filter coefficients to coefficient inputs of said plurality of variable multipliers; and summing outputs of said plurality of variable multipliers to provide an enhanced speech signal as an output of said adaptive FIR filter.

2. The method of claim 1 further comprising the step of digitizing an accelerometer input signal to provide said digital speech signal x(k).

3. The method of claim 2 further comprising the step of subtracting said enhanced speech signal from a second speech signal to provide said estimation error signal.

4. The method of claim 3 further comprising the step of digitizing a microphone input signal to provide said second speech signal.

5. The method of claim 1 wherein said step of selecting said overall signal power estimate yz(k) further comprises the step of selecting said overall signal power estimate yz(k) at said sample point k as said maximum one of said first signal power estimate y(k) and said second signal power estimate z(k) when either said first signal power estimate y(k) or said second signal power estimate z(k) exceeds a predetermined threshold.

6. An adaptive finite impulse response filter, comprising:

a signal input for receiving an input signal;

a feedback input for receiving an error signal;

an output for providing a filtered output signal;

a plurality of filter taps coupled in series with said input signal;

a plurality of variable multipliers for multiplying said input signal and outputs of said plurality of filter taps by corresponding ones of a plurality of coefficients;

a summing device for providing said filtered output signal as a sum of outputs of each of said plurality of variable multipliers; and prediction means for receiving said error signal, and for recursively updating each coefficient according to a maximum one of first and second predicted values of said filtered output signal, in response to said error signal;

said first predicted value of said filtered output signal having a first smoothing parameter associated therewith;

said second predicted value of said filtered output signal having a second smoothing parameter associated therewith;

said first smoothing parameter providing a faster prediction response after a change in said input signal than said second smoothing parameter.

7. The adaptive finite impulse response filter of claim 6 wherein said prediction means provides both said first predicted value and said second predicted value according to a normalized least-mean-squares (NLMS) predictor.

8. An adaptive finite impulse response filter, comprising:

a signal input for receiving an input signal;

a feedback input for receiving an error signal;

an output for providing a filtered output signal;

a plurality of filter taps coupled in series with said input signal;

a plurality of variable multipliers for multiplying said input signal and outputs of each of said filter taps by corresponding ones of a plurality of coefficients;

a summing device for providing said filtered output signal as a sum of outputs of each of said plurality of multipliers; and a predictor having an input for receiving said error signal, and outputs for providing corresponding ones of said plurality of coefficients;

said predictor computing first and second predicted values of said output signal and recursively updating each of said plurality of coefficients as determined by a maximum one of said first and second predicted values of said output signal, and said error signal;

said first predicted value characterized as providing a faster prediction response after a change in said input signal than said second predicted value, whereby the adaptive finite impulse response filter is characterized as having a fast attack and a slow release.

9. The adaptive finite impulse response filter of claim 8 wherein said prediction computes both said first predicted value and said second predicted value according to a normalized least-mean-squares (NLMS) predictor.

\* \* \* \* \*